UNITED STATES PATENT OFFICE.

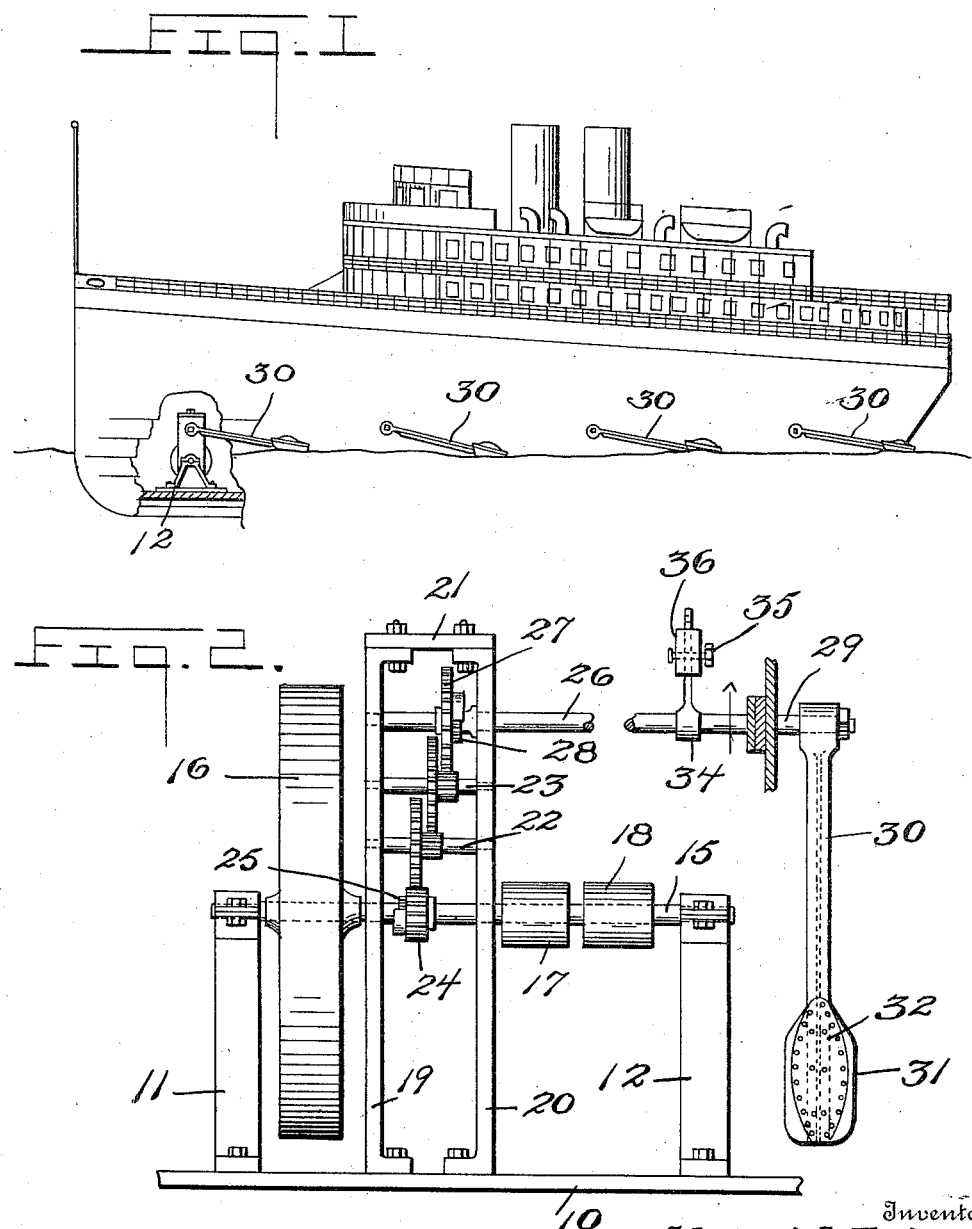

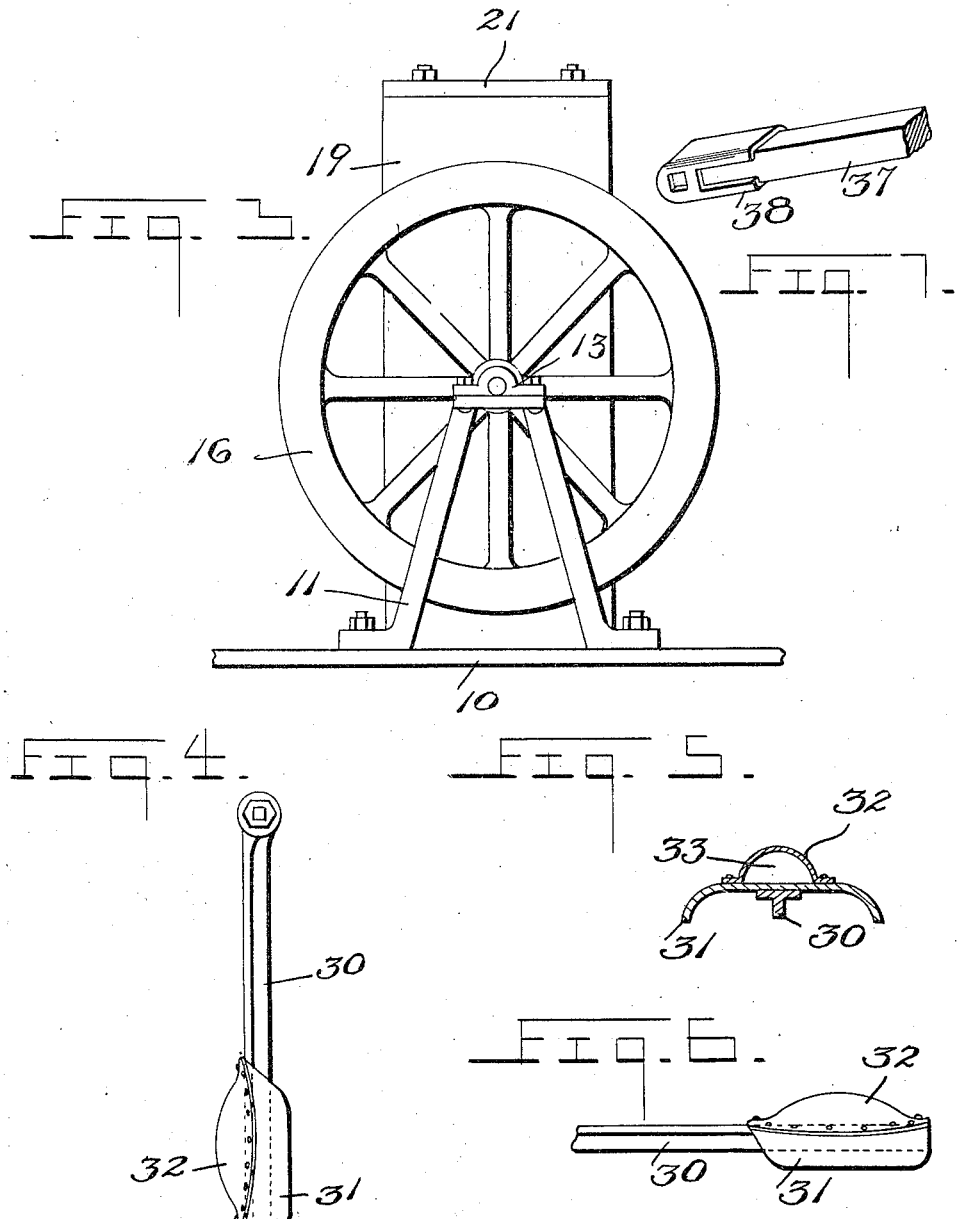

HERBERT E. FISHER, OF SAN FRANCISCO, CALIFORNIA.

SHIP'S WAVE-MOTOR.

986,627.

Specification of Letters Patent. Patented Mar. 14, 1911.

Application filed June 15. 1910. Serial No. 567,086.

*To all whom it may concern:*

Be it known that I, HERBERT E. FISHER, a subject of Great Britain, residing in San Francisco, in the county of San Francisco and State of California, United States of America, have invented certain new and useful Improvements in Ships' Wave-Motors, of which the following is a specification.

This invention relates to wave m

The primary object of said invention is to provide a ship with suitable means for utilizing power derived from the motion of the ship, and the action of the waves to generate electricity.

Another object of the invention is to so position and arrange a device of this character, that the same will generate power automatically without the assistance, or the attention of an operator.

With these and other objects in view, the present invention consists in the combination and arrangement of parts which will be hereinafter more fully described and particularly pointed out in the appended claims, it being understood that the changes in the specific structure shown and described may be made within the scope of the claims without departing from the spirit of the invention.

In the drawings: Figure 1 is a view of a ship partly in section showing the device in position, Fig. 2 a view of the same removed, Fig. 3 a side elevation of the device, Fig. 4 a detail view of the device which is adapted to contact with the water, and Figs. 5 and 6 detail views of the end portion of the device. Fig. 7 shows a modified form of the paddle member.

In the drawings: 10 designates a base upon which is bolted supports 11 and 12, the upper end portions of which, 13 and 14 support the end portions of a shaft 15. Arranged adjacent one end of said shaft is a fly wheel 16 which is keyed to said shaft. Arranged adjacent the other end of said shaft are pulleys 17 and 18. Supports 19 and 20 are bolted to the base 10 and joined at their upper ends by a beam 21. The supports 19 and 20 receive the shaft 15, and form a central bearing for the same. Arranged above the shaft 15 are the shafts 22 and 23 whose end portions are journaled in the members 19 and 20. Each of the shafts 22 and 23 is provided with gears in mesh with each other, and with a cog 24 which is arranged upon the shaft 15, said cog being intermittently clutched to said shaft by a ratchet 25. Arranged above the shaft 23 is a shaft 26 which has mounted thereon the gear 27, which is locked to said shaft by a ratchet 28, as the shaft 26 rotates in one direction, and which lies idle on said shaft when the same rotates in the opposite direction.

The structure as above described, is arranged within the ship as shown in Fig. 1, the end portion 29 being adapted to extend through the side of the vessel, through suitable bearings which will prevent the water from entering the vessel. Arranged upon the end portion of the shaft 26, is a paddle 30 which is formed of metal, being substantially T-shaped in cross section. Fig. 7 is a modified form of the paddle member in which the same is formed of wood, a suitable metallic securing device 38 being arranged on its end portion 37, said device being provided with a squared opening which is adapted to fit on the shaft 26. Secured adjacent the end portion of said paddle is a blade member 31 which is substantially U-shaped. Arranged upon the face of said member, and secured thereto by means of rivets, is the shell-like member 32 which forms the air chamber 33. Arranged upon the shaft 26, and adapted to rotate with said shaft, is an arm 34 which is provided with a plurality of apertures adapted to receive a bolt 35 in order to secure the weight 36 to said arm.

In operation, the paddle 30 lies parallel with the side of the vessel, the air chamber 33 acting as a float to retain the same on the surface of the water, the U-shaped member resting upon the surface of the water. It will be seen that as the ship lunges forward, the blade member will rise with the water, thereby rotating the shaft 26 in the direction indicated by the arrow, the weighted arm 34 being adapted to hold the shaft in such a position as to prevent the blade from sinking below the surface of the water. When the shaft 26 is rotated, motion will be transmitted to the gears positioned between the supports 19 and 20, which will cause the shaft 15 to rotate, thereby transmitting power to dynamos which are connected to pulleys 17 and 18 by means of belts. Upon the down stroke of the blade member, the shaft 26 will be rotated in the opposite direction, but this rotation of the shaft will not be transmitted to the gear, the ratchet 28 being so arranged as to lock the gear 23 to the shaft 26, only when the shaft 26 rotates in the direction indicated by the arrow. It will be seen from the foregoing that the blade member swings in the manner of a pendulum, the up-stroke which is caused by the forward plunge of the ship, being adapted to rotate the drive shaft to operate the train of gears, the down-stroke having no effect upon said gears.

What is claimed is:

1. In a wave motor, a plurality of shafts arranged parallel to each other, a paddle secured to the end portion of one of said shafts, a substantially U-shaped blade member arranged upon the end portion of said paddle, an air chamber arranged upon said blade portion, a weighted arm arranged upon said shaft, a series of gears connecting said shafts, and means arranged upon one of said shafts to transmit power.

2. A wave motor comprising a base portion, supports arranged upon said base portion, a shaft having its end portions journaled in said supports, a fly-wheel mounted upon said shaft, a plurality of pulleys mounted upon said shaft, a plurality of supports secured centrally to said base and spaced from each other, means connecting the free ends of said supports, said shaft passing through said supports, a plurality of shafts adapted to rotate within bearings formed upon said support, one of said shafts having arranged upon its end portion a member adapted to impart a partial rotation to said shaft, and a train of gears connecting all of the shafts.

3. A wave motor comprising a base portion, supports arranged adjacent the end portions of said base member, a shaft mounted to rotate within the end portions of said supports, a plurality of spaced supports arranged centrally upon said base, said shaft being adapted to pass through said supports, a pinion arranged upon said shaft at a point between said supports, a plurality of shafts having their end portions journaled in said supports, said shafts being connected to said pinion by a plurality of gears, a paddle arranged upon the end portion of one of said shafts, and weighted means carried by said shaft for holding said paddle in a horizontal plane.

4. A wave motor comprising a plurality of shafts arranged parallel to each other, said shafts being geared together, a member secured to the end portion of one of said shafts, said member being adapted to impart a partial rotation to said shaft, and an arm carried by said shaft, said arm being provided with an adjustable weight, said weight being adapted to normally retain said member in a horizontal plane.

5. A wave motor comprising a driven shaft a drive shaft, a paddle arranged upon the end portion of said drive shaft, the end portion of said paddle being provided with a substantially rectangular blade, said blade having flanged edge portions, and a member arranged upon said blade to form an air chamber.

In testimony whereof I affix my signature, in presence of two witnesses.

HERBERT E. FISHER.

Witnesses:
A. K. DAGGETT,
ALFRED CECIL HARBORDT.